Patented May 14, 1935

2,001,587

UNITED STATES PATENT OFFICE 2,001,587

MANUFACTURE OF MERCAPTO ARYL THIAZOLES

Waldo L. Semon, Silver Lake Village, and Tirey Foster Ford, Akron, Ohio, assignors to The B. F. Goodrich Company, New York, N. Y., a corporation of New York No Drawing. Application October 3, 1933, Serial No. 692,028

4 Claims. (Cl. 260—44)

This invention relates to the manufacture of organic chemicals and specifically of the class of chemicals known as mercapto arylene thiazoles.

The process of this invention consists in reacting a mixture of carbon disulphide, an arylamine and organic oxidizing agent such as an aromatic nitro compound. The oxygen of the nitro compound ultimately combines with the excess hydrogen of the amine, the remaining portions of both molecules then combining with the carbon disulphide to form the mercapto arylene thiazole in accordance with the following general equation, in which R represents an aromatic nucleus:

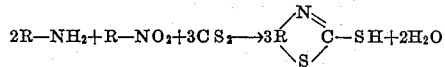

The general reaction may be represented as follows:

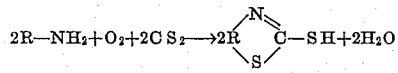

where the oxygen comes from organic oxidizing agents generally. It is preferred to use a simple nitro or nitroso compound as the source of oxygen for the reason that the oxidizing agent after giving up its oxygen is converted to an amine which can itself take part in the reaction, increasing the yield of mercapto aryl thiazole which is obtained. However, other organic oxygen-containing compounds which function as oxidizing agents such as benzoyl peroxide may be substituted under some circumstances.

The precise mechanism of the reaction is not known, hence it is to be understood that any theories herein expressed are given merely for purposes of illustration and explanation and are not to be construed as limiting the scope of the invention.

As a specific example of one embodiment of the process, mercaptobenzothiazole is prepared by heating a mixture of 466 parts by weight of aniline (5 mols), 246 parts of nitrobenzene (2 mols) and 456 parts of carbon disulphide (6 mols) in an autoclave at 220° C. for six hours. The contents of the autoclave, after cooling, are mixed with a caustic soda solution containing an excess of soda over that required to dissolve the product, say 130 parts of soda, and the resulting solution is filtered. The clear solution is then made faintly acid with hydrochloric or dilute sulphuric acid, whereupon the mercaptobenzothiazole is precipitated from solution in a good yield and in a very pure condition. The product is filtered off, washed and dried and is then ready for use.

In the above example a slight excess of aniline has been used over the quantity theoretically necessary, in order to obtain an increased yield, but if desired an excess of either of the other reagents may be used, or the proportions may be otherwise varied. If it is desired to make other mercapto arylene thiazoles the amine and nitro compound derived from the appropriate hydrocarbon are substituted for the aniline and nitrobenzene.

It is to be understood that this invention is susceptible of numerous modifications and that its scope is therefore not to be restricted except as may be required by the prior art and as indicated in the appended claims.

We claim:

1. The process for preparing a mercapto arylene thiazole which comprises heating a mixture of a mononuclear arylamine and carbon disulphide with an organic oxidizing agent to a temperature in the neighborhood of 220° C.

2. The process for preparing a mercapto arylene thiazole which comprises heating a mixture of a mononuclear arylamine, a nitro substituted mononuclear aromatic hydrocarbon and carbon disulphide to a temperature in the neighborhood of 220° C.

3. The process for preparing mercaptobenzothiazole which comprises heating a mixture of aniline, nitrobenzene and carbon disulphide to approximately 220° C.

4. The process for preparing mercaptobenzothiazole which comprises heating a mixture of approximately 2 mols of aniline, 1 mol of nitrobenzene and 3 mols of carbon disulphide to approximately 220° C. in a closed vessel.

WALDO L. SEMON.
TIREY FOSTER FORD.